(12) United States Patent
Bassi

(10) Patent No.: US 7,810,536 B2
(45) Date of Patent: Oct. 12, 2010

(54) APPARATUS FOR POSITIONING PACKING BOXES

(75) Inventor: Gino Bassi, San Giovanni in Persiceto (IT)

(73) Assignee: Emmeci S.p.A., Milan (IT)

( * ) Notice: Subject to any disclaimer, the term of this patent is extended or adjusted under 35 U.S.C. 154(b) by 369 days.

(21) Appl. No.: 11/937,514

(22) Filed: Nov. 9, 2007

(65) Prior Publication Data

US 2008/0110570 A1 May 15, 2008

(30) Foreign Application Priority Data

Nov. 14, 2006 (IT) .......................... BO2006A0772

(51) Int. Cl.
*B29C 65/00* (2006.01)
(52) U.S. Cl. .......................... 156/379; 156/64; 156/350; 156/351; 156/367; 156/378; 156/DIG. 2; 156/DIG. 25; 156/DIG. 26; 156/DIG. 27; 156/DIG. 28; 156/DIG. 34; 156/DIG. 37; 156/DIG. 41; 156/DIG. 44; 156/DIG. 45; 156/DIG. 46; 198/340; 198/341.01; 198/341.05; 198/341.08; 198/349; 198/358; 198/456; 198/502.3

(58) Field of Classification Search .................... 156/65, 156/64, 350, 351, 358, 360, 362, 363, 364, 156/367, 378, 379, DIG. 2, DIG. 25, DIG. 26, 156/DIG. 27, DIG. 28, DIG. 34, DIG. 37, 156/DIG. 41, DIG. 44, DIG. 45, DIG. 46; 198/340, 341.01, 341.05, 341.08, 358, 349, 198/456, 502.3

See application file for complete search history.

(56) References Cited

U.S. PATENT DOCUMENTS

| 6,401,936 | B1 * | 6/2002 | Isaacs et al. | ................. 209/656 |
| 6,758,323 | B2 * | 7/2004 | Costanzo | ............... 198/457.02 |
| 7,007,792 | B1 * | 3/2006 | Burch | .................... 198/457.02 |
| 2006/0180440 | A1 | 8/2006 | Lewis et al. | |

FOREIGN PATENT DOCUMENTS

JP                11320713 A        11/1999

* cited by examiner

*Primary Examiner*—Kat Wyrozebski
*Assistant Examiner*—Joshel Rivera
(74) *Attorney, Agent, or Firm*—Pearne & Gordon LLP

(57) ABSTRACT

An apparatus for positioning packing boxes relative to a covering sheet comprises a belt for conveying the sheet from a gluing unit to a device for centering the box on the pre-glued sheet and optical sensors for identifying the position of the sheet on a belt conveyor surface, the belt being made with at least two regions of the conveyor surface having contrasting colors.

3 Claims, 2 Drawing Sheets

APPARATUS FOR POSITIONING PACKING BOXES

BACKGROUND OF THE INVENTION

The present invention relates to an apparatus for positioning packing boxes, in particular for covering boxes with a pre-glued covering sheet.

There are prior art so called "covering machines" for joining an erected box and a covering sheet to which glue was previously applied.

Such machines have a movement system with which the box is conveyed to a unit which applies the glued sheet to the walls of the box to complete box covering.

The boxes are brought to the covering unit already joined to the respective covering sheet. In this situation, the box rests on the pre-glued inner surface of the sheet at a central portion of the covering sheet, with the respective opening facing upwards.

For this purpose covering machines have a centering or "aiming" station, positioned along a conveyor line consisting of a belt with suction which holds the sheet and conveys it from the gluing roller to the covering unit, in which the box is centered on the pre-glued sheet.

Box centering is made possible by sensors which optically detect the position of the sheet on the conveyor belt and consequently control box positioning at the moment it is joined to the sheet.

To identify the position of the sheet on the conveyor belt, the optical sensors are aimed at the sheet at specific points where they are able to detect a color contrast between the sheet and the belt below, thus allowing precise calculation of the position for box centering on the sheet.

Operation of the prior art systems is satisfactory when the color difference between the sheet and the belt makes recognition of the position of the sheet certain.

Otherwise, for example if dark sheets are conveyed by a belt which is also dark, it is possible and often the case that there are positioning errors and consequently finished box production rejects.

To overcome this disadvantage, it is common practice in the sector to apply longitudinal adhesive strips at the sensor reading areas, the adhesive strips being colored with a color that contrasts with the sheet color.

However, this solution has a number of disadvantages linked to the strips wearing and the uncertainties that this involves in detecting the position of the sheet.

Moreover, to allow the reading of sheets having different dimensions, relatively wide strips would have to be used (referring to the transversal dimension of the belt), which allow reading even for large sheets but which at the same time, due to their width, would reduce the capacity for suction of the sheet on the belt and therefore the stability of its position.

The disadvantages referred to are particularly felt when one wants to change the color and size of the sheet rapidly without having to interrupt production.

SUMMARY OF THE INVENTION

The aim of the present invention is therefore to overcome the above-mentioned disadvantages by providing an apparatus for positioning packing boxes in which the conveyor belt has a conveyor surface made with parts having at least two contrasting colors, preferably the two longitudinal halves in the direction of belt feed.

Accordingly, the present invention achieves this aim with an apparatus, a conveyor system and a belt as described in the claims herein.

BRIEF DESCRIPTION OF THE DRAWINGS

The technical features of the invention, in accordance with the afore-mentioned aims, are clearly indicated in the claims herein and the advantages of the invention are more apparent in the detailed description which follows, with reference to the accompanying drawings, which illustrate a preferred embodiment by way of example only and without limiting the scope of the invention, in which:

DESCRIPTION OF THE PREFERRED EMBODIMENTS

Figure 1A:
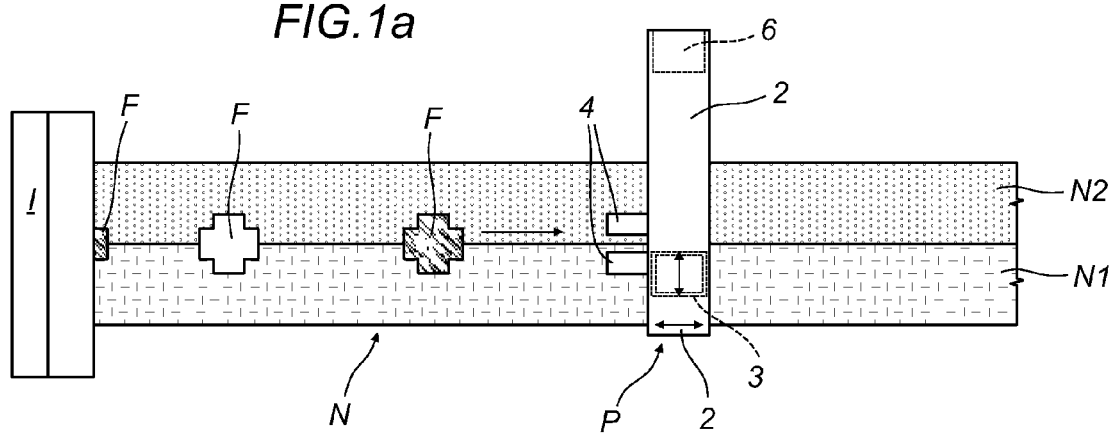
FIGS. 1a and 1b are schematic top views of the apparatus according to the invention, with two possible sheet arrangements on the conveyor belt.
Figure 1B:
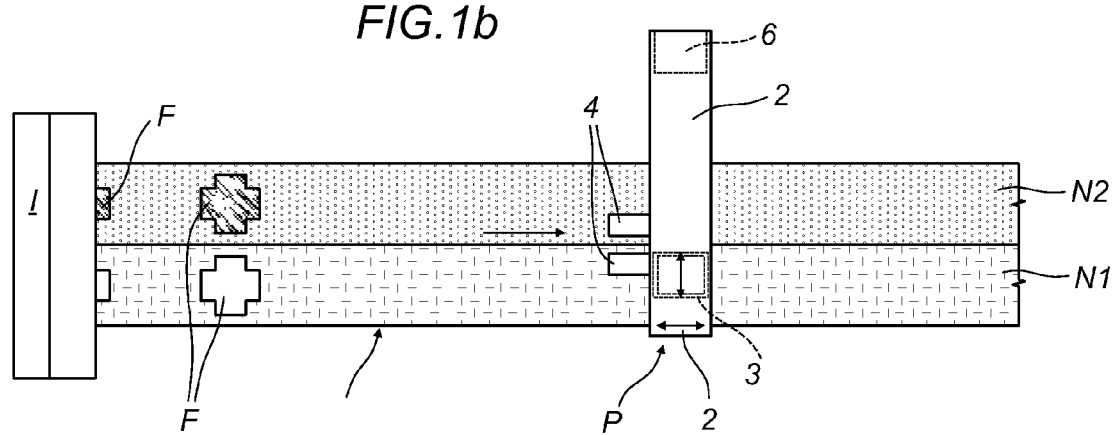
Figure 2:
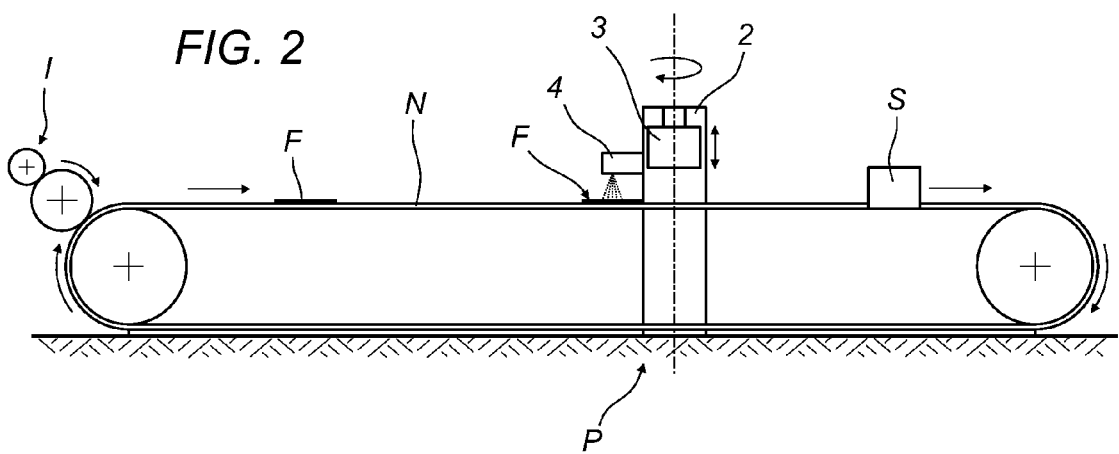
FIG. 2 is a side view of the diagram of FIG. 1.

With reference to the accompanying drawings, an apparatus in accordance with the invention is equipped with a conveyor system 1 comprising a belt N, for example of the type with suction, which moves a succession of sheets F in a longitudinal direction (from left to right in FIG. 1) between a gluing unit I which feeds onto the belt the sheets F with glue applied on their upper surface, and a centering station P for placing the boxes S on top of the pre-glued sheets F, equipped with a system 4 for optically detecting the position of the sheets F.

Figure 3:
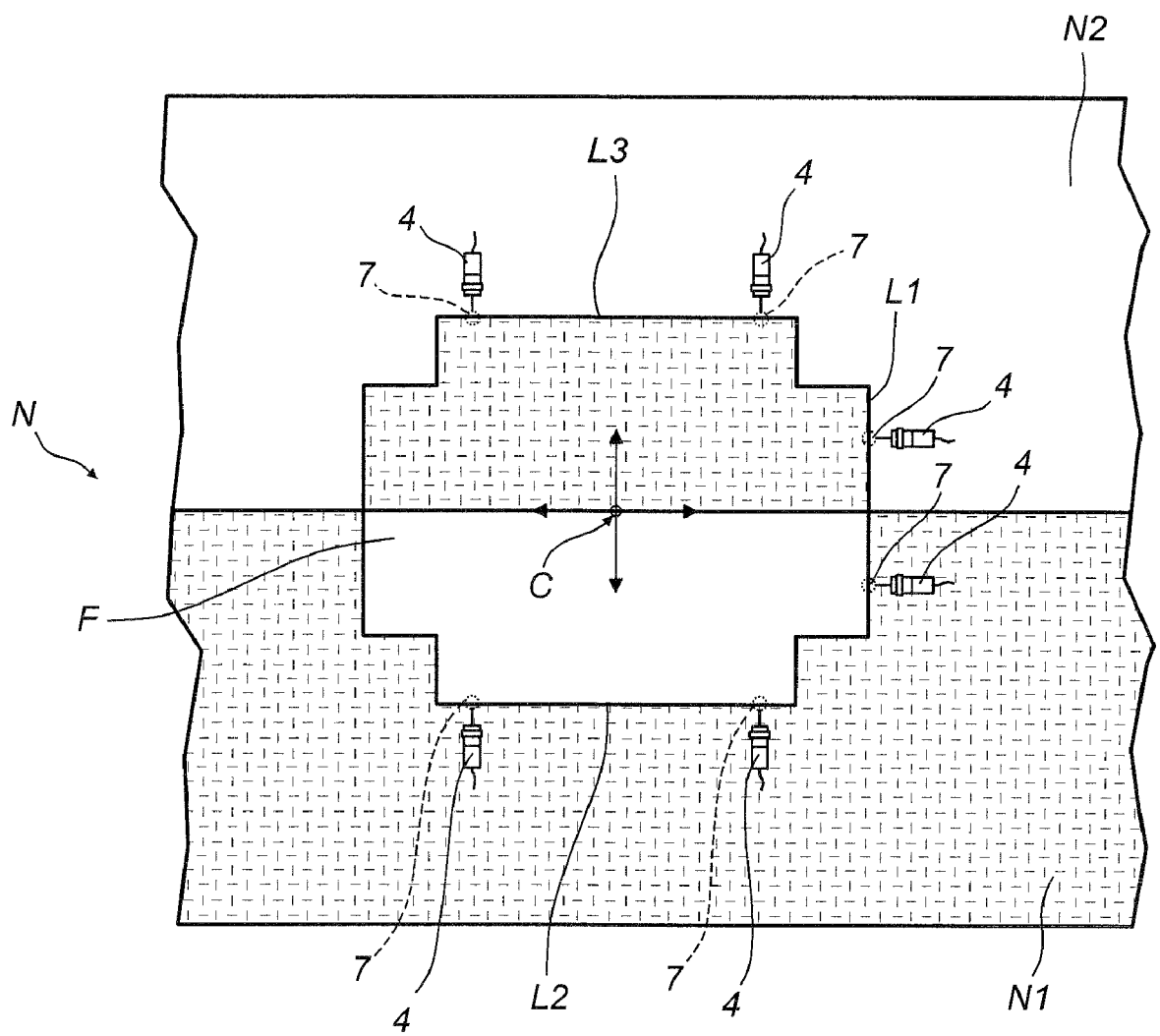
FIG. 3 is a schematic view of a detail of detection of the position of a sheet in an apparatus in accordance with the invention.

The system 4 preferably has one or more photocells aimed at the belt N at one or more pre-selected detecting points 7, more clearly seen in FIG. 3.

In operation, the belt N moves forward to bring the sheet F to the aiming or centering station P where the sheet stops for centering.

While the belt is stopped, the station P performs a longitudinal movement above the sheet, during which the sensors 4 (usually photocells) can recognize the variation in color between the sheets and the belt below, and detect the position of the sheet in a position precisely below the box to be covered.

For this purpose, in the station P, the box S, of the suitable size, may be moved transversally along a cross-member 2 supported by an upright 6 in turn able to move longitudinally, until it is vertically aligned with the glued area of the sheet F, then it is lowered together with a head 3 which has a vertical stroke so that it can be placed on top of the sheet.

Moreover, the box S may be rotated about a vertical axis by suitable actuators, so that errors of sheet orientation on the belt can be corrected.

Downstream of the station P, the box S, now glued on the sheet F, is moved again until it arrives at a covering station in which the sheet F is applied to the box to obtain the finished product.

The covering station is of the known type and therefore is not described in further detail.

According to the invention, the belt N is made with at least two parts having contrasting colors, in the example described the longitudinal halves N1 and N2.

Advantageously, this solution makes it easy for the sensors 4 to detect dark colored sheets using the light half of the belt N2 as the conveyor surface, and/or light colored sheets using the dark part N1 of the belt.

In a preferred embodiment, the sheets F may be fed centrally and positioned along the center line of the belt N (FIG. 1a) to allow use of the same configuration of the aiming units P and the covering unit.

However, the succession of sheets F may also be fed (FIG. 1b) off center on the respective half N1, N2 with contrasting color.

In order to be able to read the position of the sheets, in the various possible embodiments, the sensors 4 may be part of a single group able to move transversally or in two separate groups positioned at two reading areas.

Advantageously, the use of a belt N with two longitudinal halves N1 and N2 having contrasting colors allows simple movement of the observation points 7 after a size change for the sheet conveyed by the belt, without having to apply a different strip having a contrasting color applied on the belt, as was the case in the prior art.

In the example in FIG. 3 the points 7 are at a front L1 and the sides L2, L3 of a generic sheet F conveyed by the belt N.

The dimensions of the sheet increase symmetrically relative to a central point C of the inner section of the sheet (arrows in FIG. 3), although there is constantly the possibility of recognizing the position of the sheet thanks to the belt below which has a contrasting color.

What is described above is referred to specifically in combination with a machine for covering packing boxes because the solution adopted has particular advantages in association with the conveying of sheets in a covering line.

However, it shall be understood that the same inventive concept may have various applications within the scope of moving objects on a belt, in which the position of the object conveyed must be detected by means of optical contrast with the conveyor belt.

The invention described above is susceptible of industrial application and may be modified and adapted in several ways without thereby departing from the scope of the inventive concept. Moreover, all details of the invention may be substituted by technically equivalent elements.

What is claimed is:

1. An apparatus for positioning packing boxes relative to a covering sheet, comprising:
   a belt for conveying the sheet from a gluing unit to a station for centering the box on the pre-glued sheet,
   optical sensors for identifying the position of the sheet on a belt conveyor surface, the sensors being configured to recognize the variation in color between the sheet and the belt below, upon a relative movement between the sheet and the sensors,
   wherein the belt is a single belt defining a continuous conveyor, made with at least two longitudinal regions of the conveyor surface having contrasting colors, which are parallel with the belt direction of feed, and wherein the apparatus is adapted to adjust the position of the box in the station with respect to the sheet, while the belt is stopped.

2. The apparatus according to claim 1, wherein it has several groups of sensors positioned to read the position of the sheet on each of the regions having a contrasting color.

3. The apparatus according to claim 1, wherein the regions are colored black and white.

* * * * *